Figure 3:
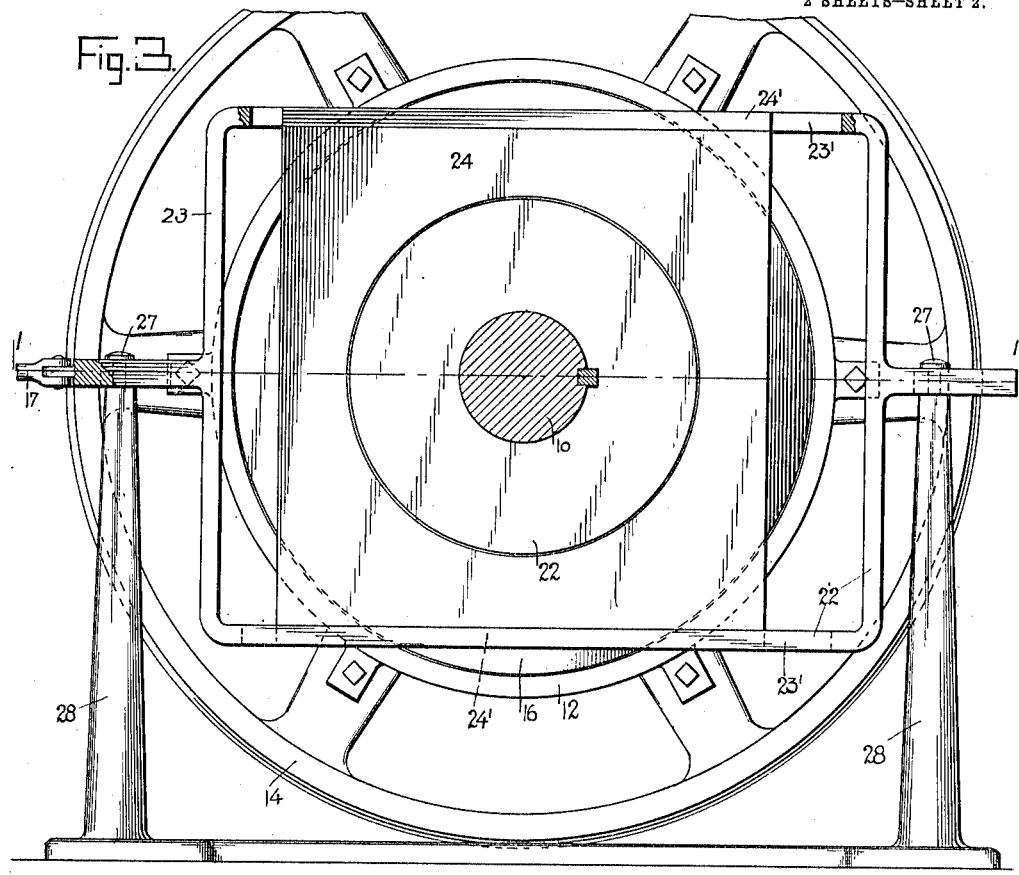

L. A. PAGANI.
FRICTION CLUTCH.
APPLICATION FILED DEC. 21, 1912.
1,081,861.
Patented Dec. 16, 1913.
2 SHEETS—SHEET 1.
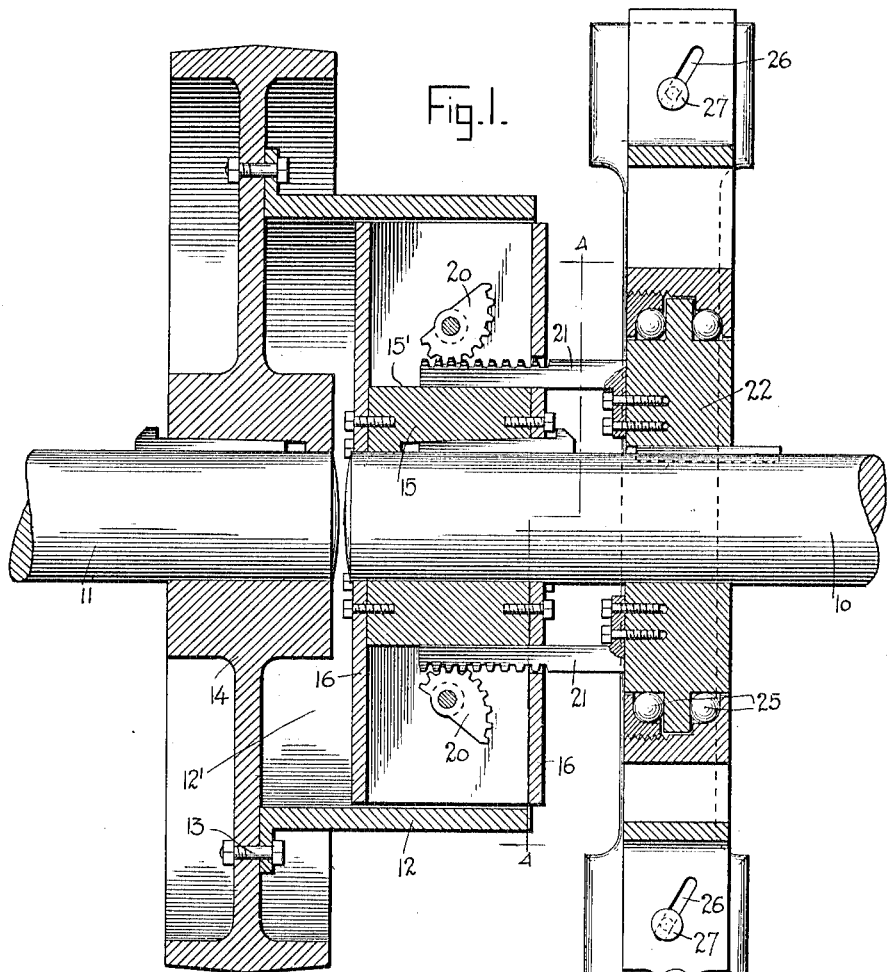
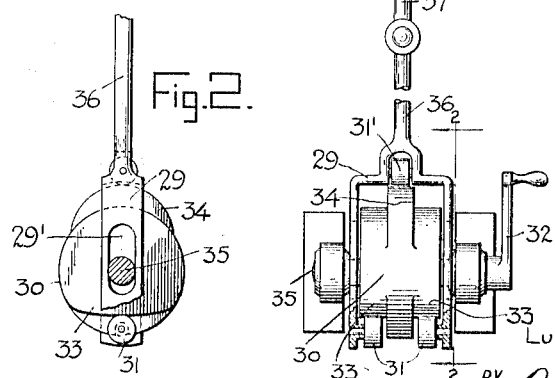
WITNESSES
C. K. Reichenbach.
Geo. H. Beele
INVENTOR
Luigi A. Pagani,
BY Munn & Co.
ATTORNEYS

L. A. PAGANI.
FRICTION CLUTCH.
APPLICATION FILED DEC. 21, 1912.

1,081,861.

Patented Dec. 16, 1913.

2 SHEETS—SHEET 2.

WITNESSES
E. K. Reichenbach.
Geo. H. Beeler.

INVENTOR
Luigi A. Pagani,
BY Munn & Co
ATTORNEYS

UNITED STATES PATENT OFFICE.

LUIGI ALBERTO PAGANI, OF WEST HOBOKEN, NEW JERSEY.

FRICTION-CLUTCH.

1,081,861.  Specification of Letters Patent.  Patented Dec. 16, 1913.

Application filed December 21, 1912. Serial No. 737,983.

*To all whom it may concern:*

Be it known that I, LUIGI A. PAGANI, a subject of the King of Italy, and a resident of West Hoboken, in the county of Hudson and State of New Jersey, have invented a new and Improved Friction-Clutch, of which the following is a full, clear, and exact description.

This invention relates to machine construction and has particular reference to clutches adapted for connecting one running part, for simultaneous operation, to another part.

The object of the invention is to provide a friction clutch provided with novel means for adjusting the gripping shoes.

More particularly stated, the invention comprises a clutch, one part of which is provided with a plurality of shoes movable outwardly into frictional engagement with a flange carried by another part and such shoes being movable by means of pairs of right and left screws, each pair of screws having a pinion, and means being provided for coöperation with said pinions to cause the several pairs of screws to rotate simultaneously and hence operate the shoes radially in unison with superior force.

The foregoing and other objects of the invention will hereinafter be more fully described and claimed and illustrated in the drawings forming a part of this specification in which like characters of reference indicate corresponding parts in all the views, and in which—

Figure 4:
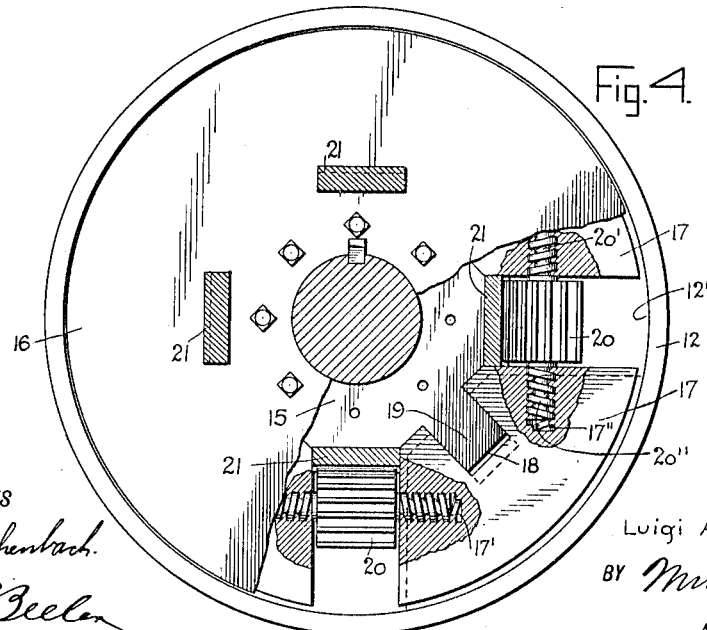

Figure 1 is a transverse sectional view of a preferred embodiment of the invention taken substantially on the line 1—1 of Fig. 3; Fig. 2 is a face view of a detail, partly in section, on the line 2—2 of Fig. 1; Fig. 3 is a side elevation looking toward the left in Fig. 1 and partly in section; Fig. 4 is a fragmentary detail, partly in section, on the line 4—4 of Fig. 1.

The several parts of the device may be made of any suitable materials and the relative sizes and proportions thereof may be varied to a considerable extent without departing from the spirit of the invention.

Referring more particularly to the drawings, I show at 10 what may be considered as a driving shaft and in alinement therewith at 11 a driven shaft. It is to be understood, however, that so far as the practical operation of the clutch is concerned, either shaft may be the driver. Rotation of the driving shaft is herein shown as being transmitted to the driven shaft by means of a friction clutch comprising a flange 12 rigidly connected in any suitable manner as by bolts 13 to a pulley or wheel 14 secured to the driven shaft. The other main portion of the clutch comprises a hub 15 rigidly secured to the driving shaft. Connected to the ends of the hub 15 are parallel plates or disks 16 which lie within the gripping surface 12' of the aforesaid flange 12. A plurality of shoes 17 are associated with the hub 15 and are movable radially therefrom outwardly into frictional contact with said surface 12'. Each shoe is slotted as shown at 18 for coöperation with a radially projecting hub tongue 19 whereby the shoe is prevented from moving circumferentially with respect to the hub. Furthermore, each of the shoes is provided with threaded sockets 17' and 17'', the threads of which are of opposite character and the axes of said sockets being arranged at an angle to each other in conformity with the number of shoes employed in the clutch. As herein shown, I provide preferably four shoes and therefore the sockets are at right angles to each other.

Extending between and coöperating with the adjacent ends of each two shoes 17 is a spreader comprising a pinion 20 rigidly mounted upon a shaft having right and left threads on its ends on opposite sides of the pinion, the end 20' having a right handed thread operating in the socket 17', and the end 20'' having a left handed thread coöperating with the socket 17''. The several spreaders between adjacent shoes are preferably all alike and similarly arranged with respect to the hub 15 and said shoes. Any suitable means may be provided for operating said pinions 20 simultaneously in the same direction whereby the shoes will be moved forcibly outward into engagement with said flange 12. As shown, I provide a series of racks 21 which are connected to a collar 22 slidable with or upon the driving shaft 10. The racks are shown as extending substantially parallel to the axis of said shaft, and when moved longitudinally they will cause rotation of the spreaders with the result already indicated.

Any suitable arrangement may be devised to cause the racks 21 to be kept in mesh with the teeth of the pinions 20, but for the sake of simplicity of construction and therefore the highest practicality of the device I provide for the racks a simple longitudinal movement parallel to the axis of the shaft. When, however, the spreaders are rotated so as to cause the shoes to be forced outwardly, the tendency for the spreaders to be carried radially out of mesh with the racks is prevented by making the pinions each in the form of a volute. The eccentricity of the teeth on each pinion will provide for a constant coöperation between the same and the adjacent rack throughout the rotation of the spreader. It is to be noted also that this form of pinion is such that the initial rotation thereof will be at a comparatively rapid speed with a subsequent slower speed and greater force due to the increased effective diameter of the pinions when the maximum force is required to set the clutch. In other words, while I may provide an actuating means for the racks having a uniform movement, the spreaders will be operated at a variable movement with a corresponding variation in effective force. The shoes are guided in their outward movements between the opposing faces of the aforesaid disks 16.

As a suitable means for operating the racks, I provide a yoke 23 shown as substantially rectangular in form and having its upper and lower bars slotted, as shown at 23'. A head 24 is mounted within the yoke and has tongues 24' projecting into said slots 23'. The yoke embraces not only the head 24 but surrounds the shaft 10 and collar 22. I provide preferably anti-friction bearing balls 25 between the collar and the head. The ends of the yoke are provided with diagonal slots 26 both of which are arranged the same with respect to the axis of the shaft 10 and through which studs 27 project vertically and thereby maintain the yoke in proper position, the studs being connected to standards 28 of any suitable nature.

At one end of the yoke is connected an actuator comprising a fork 29 having coöperation with an eccentric 30 mounted on a shaft parallel to the shaft 10. The fork is shown provided with anti-friction rollers 31 and 31' whereby, when the eccentric 30 is rotated as by a crank 32, the fork 29 will shift the yoke 23 laterally of the shaft 10 and cause the yoke, the collar 22 and the racks 21 to move longitudinally of the shaft 10 to rotate the pinions 20 in one direction or the other depending upon the portion of the eccentric which is effective at any particular time. The rollers 31 coöperate with cams 33 and the roller 31' coöperates with a cam 34, and in order to steady the operation of the fork it is provided with lateral slots 29' through which the shaft 35 of the eccentric 30 passes. The connecting rod 36 of the actuator is preferably connected to the yoke 23 by means of a link 37 in order to permit longitudinal movement of the yoke 23 aforesaid without disturbing proper actuation of the actuator.

Having thus described my invention, I claim as new and desire to secure by Letters Patent:—

1. The herein described clutch comprising a hub, a series of shoes associated with the hub and movable radially with respect thereto, a flange surrounding the shoes and adapted to be engaged thereby, and means to forcibly project said shoes radially, with an initial rapid movement and a subsequent relatively slow movement with increased force.

2. In a clutch, the combination of a driving member, a driven member surrounding the same, a series of shoes movable outwardly from the driving member and into contact with the driven member, a series of spreaders connecting the said shoes each to each for simultaneous movement, each spreader including a volute pinion, and a series of racks movable longitudinally of said driving member and serving to operate said spreaders.

3. The combination with a friction clutch having relatively movable parts, of means for operating said movable parts comprising a collar, a yoke surrounding and connected to said collar and having a pair of diagonal slots, stationary means associated with said yoke and having pins extending through said slots, and an actuator coöperating with said yoke adapted to cause movement of the yoke in a direction corresponding to said slots.

4. The combination with a clutch having relatively movable gripping parts, of means for operating said parts either outwardly or inwardly simultaneously, said operating means comprising a yoke having diagonally arranged guiding means and an actuator connected to said yoke, said actuator including an eccentric having oppositely arranged cams whereby, when the eccentric is rotated, the aforesaid yoke will be operated accordingly, substantially as set forth.

In testimony whereof I have signed my name to this specification in the presence of two subscribing witnesses.

LUIGI ALBERTO PAGANI.

Witnesses:
 GEO. L. BEELER,
 PHILIP D. ROLLHAUS.

---

Copies of this patent may be obtained for five cents each, by addressing the "Commissioner of Patents, Washington, D. C."